United States Patent [19]

Kang

[11] Patent Number: 5,643,829
[45] Date of Patent: Jul. 1, 1997

[54] METHOD FOR THE FABRICATION OF MULTILAYER ELECTROLUMINESCENCE DEVICE

[75] Inventor: Hai Yong Kang, Seoul, Rep. of Korea

[73] Assignee: Goldstar Electron Co., Ltd., Cheongju, Rep. of Korea

[21] Appl. No.: 355,777

[22] Filed: Dec. 14, 1994

[30] Foreign Application Priority Data

Dec. 15, 1993 [KR] Rep. of Korea ............... 27845/1993

[51] Int. Cl.$^6$ ............................................. H05B 33/14
[52] U.S. Cl. ..................... 437/180; 313/463; 313/502; 313/504; 313/506; 252/301.6 R; 252/301.65
[58] Field of Search ........................ 313/463, 502, 313/503, 504, 506, 486, 487; 315/169.3; 428/917, 690; 257/98; 437/180; 252/301.6 R, 301.6 S, 301.4 R

[56] References Cited

U.S. PATENT DOCUMENTS

| | | | |
|---|---|---|---|
| 4,720,436 | 1/1988 | Ohseto et al. | 428/690 |
| 4,857,228 | 8/1989 | Kabay et al. | 252/301.4 S |
| 4,861,033 | 8/1989 | Migita et al. | 313/502 |
| 4,900,584 | 2/1990 | Tuenge et al. | 427/66 |
| 4,914,348 | 4/1990 | Kameyama et al. | 313/509 |
| 4,945,009 | 7/1990 | Taguchi et al. | 428/690 |
| 4,977,350 | 12/1990 | Tanaka et al. | 313/505 |
| 5,325,277 | 6/1994 | Suzuki et al. | 313/506 |
| 5,346,776 | 9/1994 | Taniguchi et al. | 428/690 |

FOREIGN PATENT DOCUMENTS

| | | |
|---|---|---|
| 1-146288 | 6/1989 | Japan . |
| 1-4912 | 11/1989 | Japan . |

Primary Examiner—David E. Graybill
Attorney, Agent, or Firm—Fleshner & Kim

[57] ABSTRACT

There is provided a method for the fabrication of multilayer electroluminescence device, comprising the steps of: forming a lower electrode with a predetermined pattern on a substrate: forming a first insulation layer on the lower electrode atop the substrate; forming a multiply luminescent layer consisting of CaS and SrS on the first insulation layer at the same temperature with that for the first insulation layer; forming a second insulation film on the luminescent layer; and forming an upper electrode with a predetermined on the second insulation layer.

In the multiply luminescent layer, a plurality of CaS plies and a plurality of SrS plies are formed in such a way that the CaS plies and the SrS plies alternate with each other and the outmost upper and lower plies are formed of CaS.

The constituent substances for the multiply luminescent layer, CaS and SrS, can be deposited at the same temperature and have similar lattice constants which can lead to a matched interface between the CaS and SrS plies. By virtue of these advantages, stresses imposed on the interface, including thermal stress, can be significantly reduced.

In addition, the matched interface makes electrons be accelerated with large energy, so that the fabricated multilayer luminescence device may show good quality.

4 Claims, 2 Drawing Sheets

METHOD FOR THE FABRICATION OF MULTILAYER ELECTROLUMINESCENCE DEVICE

BACKGROUND OF THE INVENTION

1. Field of the invention

The present invention relates, in general, to a method for fabricating a multilayer electroluminescence device emitting a light of blue color and, more particularly, to a method which can prevent a peeling phenomenon of delaminating constituent plies in a luminescent layer by adopting SrS and CaS as materials for the constituent plies.

2. Description of the Prior Art

Until recently, there was extensively used a cathode ray tube (hereinafter referred to as "CRT") as an information display device. To date, as the information display device is strongly required to be less heavy, more solid and more flat, research and development for next generation information display devices has actively proceeded. As a result, an electroluminescence device, a liquid crystal display, a light emitting diode, and a plasma display panel are developed.

Among such information display devices, particularly, an electroluminescence device, an active solid display device in which hot electrons produced by high electric field may be interacted with a luminescent center to emit light, largely attracts scientific and commercial attention and its development is being watched with keen interest because it can have large display area and show superiority in luminance, color contrast and view angle.

Recently, in an electroluminescence device which is based on ZnS, respective luminances of yellow color and green color have been able to be obtained sufficiently to put the electroluminescence device into practice but neither red color nor blue color has been able to be obtained enough.

To accomplish multicoloration yet high luminance in an electroluminescence device, active research and study has been directed to novel luminescent basic substances, for example, a CaS and a SrS luminescent phosphors, instead of the conventional basic substance, ZnS.

Meanwhile, a white light EL device, a newly developed device, in which double luminescent centers are added into alkali earth luminescent phosphor has been and continues to be actively researched. Since it is proved that the white light EL device is able to control three primary colors with a filter as well as be utilized as a monocolor display device, it significantly attracts attention.

Now, in order to better understand the background of the present invention, a description will be made of a conventional multilayer electroluminescence device and a method for fabricating the same, along with its problems.

Referring initially to FIG. 1, there is shown a structure of a conventional multilayer electroluminescence device. As shown in this figure, the conventional multilayer electroluminescence device has a substrate 1 on which a lower electrode 2, a first insulation layer 3, a multiply luminescent layer 4, a second insulation layer 5 and an upper insulation layer 6 are in sequence deposited with the lower and the upper electrodes 2, 5 formed in respective predetermined patterns.

Referring now to FIG. 2, there is in detail shown the luminescent multilayer 4. As shown in the FIG. 2, a ZnS ply 7 and a SrS ply 8 doped with cesium for emission of a light of blue color are alternatively laminated with the uppermost layer and the lowest layer formed of ZnS, in the multiply luminescent layer 4. Accordingly, the uppermost ply and the lowest ply, both made of ZnS, come into contact with the first insulation layer 3 and the second insulation layer 5, respectively.

With regard to function of the multiply luminescent layer 4, the upper and lower plies of ZnS in the multiply luminescent layer 4 serve as buffer layers which not only prevent the first and second insulation layers 3, 5 from chemically reacting with the SrS ply 8, a fluorescent layer, but also improve crystallinity of the SrS ply 8. On the other hand, the intermediate plies of ZnS 7 in the multiply luminescence layer play a role of acceleration layers in which excited electrons are accelerated. The intermediate plies of SrS 8 emit light by means of the accelerated electrons.

Following is a description of a fabrication method for the conventional multilayer electroluminescence device.

First, on a substrate 1, for example, a glass substrate, there is deposited indium tin oxide (hereinafter referred to as "ITO") at a thickness of about 2,000 Angstrom which is then subjected to photolithography, to form a transparent lower electrode 2 of ITO having a predetermined pattern.

Subsequently, using a sputtering process, a material selected from a group consisting of, for example, $Y_2O_3$, $Si_3N_4$, $Ta_2O_5$, $SiO_2$, $SiON$, $SrTiO_3$, $BaTiO_3$, PLZT and $PbTiO_3$, is deposited at a thickness of about 3,000 Angstrom on the substrate 1 provided with the lower electrode 2, so as to form a first insulation layer 3.

Thereafter, using an electron beam evaporation or sputtering process, a ZnS ply 7 is deposited at a thickness of about 1,000 Angstrom at 220° C. on the first insulation layer 3, followed by deposition of a SrS ply 8 doped with cesium in a thickness of 1,500 Angstrom at 500° C. on the ZnS ply 7. The cesium doping emits light of blue color. Until the 5 to 8 SrS plies are formed in the multiply luminescent layer 4, other ZnS plies 7 and other SrS plies 8 are alternatively laminated in the just-mentioned manner. As previously described, the multiply luminescent layer 4 has an lowest ply and an uppermost ply which both are formed of ZnS.

Next, a second insulation layer 5 is deposited in a thickness of about 3,000 Angstrom on the luminescent multilayer 4. As a result, the lowest ply and the uppermost ply of the multiply luminescent layer come into contact with the first insulation layer 3 and the second insulation layer 5, respectively.

Finally, a metal, for example, aluminum is deposited at a thickness of about 2,000 Angstrom, which is then subjected to photolithography, to form an upper electrode having a predetermined pattern.

In such conventional electroluminescence device, application of an alternating current voltage of about 150 V to both the upper and lower electrodes produces high electric fields at the interface between the first insulation film 3 and the luminescent multilayer 4 and at the interface between the second insulation layer 5 and the luminescent multilayer 4. By virtue of these high electric fields produced at the interfaces, electrons which are in an interface state between the first insulation layer 3 and the luminescent multilayer 4 and in an interface state between the second insulation layer 5 and the luminescent multilayer 4 are accelerated and thus transformed into so-called hot electrons with tunneling to a conduction band of the ZnS ply 7 of the luminescent multilayer.

While a portion of the hot electrons impact upon a luminescent center, for example $Mn^{2+}$ doped in ZnS which is a base substance of the multiply luminescent layer 4, to excite the luminescent center, a portion of the hot electrons ionizes the base substance, coupling with holes. As a result, electron-hole pairs are produced.

As the hot electrons travel in the luminescent layer 4, they further impact upon cesium, the dopant of the SrS ply 8, to emit light. For this luminescent mechanism, the outermost electrons of the cesium are excited to the conduction band by absorbing energy upon impact and then falls into a valence band. In the meanwhile, a light corresponding to the same energy as difference between the conduction band and the valence band is emitted from the luminescent layer 4.

The reason why a multiply luminescent layer is employed in an electroluminescence device is that the intensity of a light emitted from trailing edge is more increased, allowing more bright luminance.

Respective plies of the multiply luminescence layer 4 are made of Periodic table II-VI group compounds, that is, alkali earth sulfides and have large band gap. Practically representative substances for the multiply luminescence layer includes SrS and ZnS.

Lattice constants of SrS and ZnS are 1.13 Angstrom and 0.74 Angstrom, respectively. The difference of the lattice constant between SrS and ZnS reaches even 35%, which is significantly larger than the maximum allowable difference of the lattice constant required to obtain a matched interface, 16%. Therefore, lamination of the two plies showing a large difference of lattice constant, the SrS ply 8 and the ZnS ply 7 leads to a mismatched interface therebetween, as shown in FIG. 3.

At the mismatched interface between the SrS ply 8 and the ZnS play 7 laminated in the luminescent layer of the conventional luminescence device, stress causes a peeling phenomenon that the SrS ply 8 and the ZnS play 7 are delaminated, ultimately breaking the multilayer electroluminescence device.

In addition, the ZnS ply 7 is deposited at 220° C., whereas the SrS ply 8 is at 500° C. Accordingly, to effect alternative deposition of the ZnS ply 7 and the SrS ply 8 in the conventional multilayer luminescence device, the deposition temperature must be changed alternatively, adding thermal stress into the two plies. Wherefore, a significant disadvantage of the prior art luminescence device is that this thermal stress is a main factor aggravating the peeling phenomenon.

SUMMARY OF THE INVENTION

Therefore, an object of the present invention is to overcome the above problems encountered in prior arts and to provide a method for the fabrication of multilayer luminescence device, capable of preventing the peeling phenomenon and thus improving multilayer luminescence device in stability.

Based on the through and intensive research and study by the present inventors, the above object of the present invention could be accomplished by a provision of a method for the fabrication of multilayer luminescence device, comprising the steps of: forming a lower electrode with a predetermined pattern on a substrate: forming a first insulation layer on the lower electrode atop the substrate; forming a multiply luminescent layer on the first insulation layer at the same temperature with that for the first insulation layer; forming a second insulation film on the luminescent layer; and forming an upper electrode with a predetermined on the second insulation layer.

BRIEF DESCRIPTION OF THE INVENTION

The above object and other advantages of the present invention will become more apparent by describing in detail the preferred embodiment of the present invention with reference to the attached drawings in which.

DETAILED DESCRIPTION OF THE PREFERRED EMBODIMENTS

Figure 1:
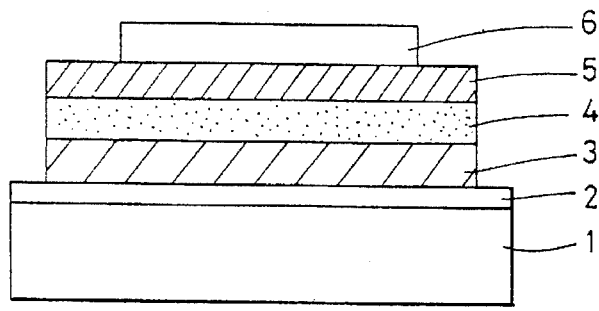
FIG. 1 is a schematic cross sectional view showing a structure of a conventional multilayer luminescence device containing a multiply luminescent layer.

The application of the preferred embodiments of the present invention is best understood with reference to the accompanying drawings, wherein like reference numerals are used for like and corresponding parts, respectively.

Figure 4:
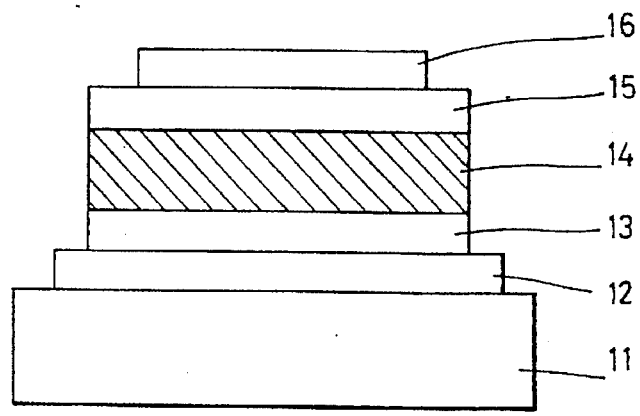
FIG. 4 is a schematic cross sectional view showing a structure of a multilayer luminescence device containing a multiply luminescent layer, according to the present invention.

Referring initially to FIG. 4, there is shown a structure of a multilayer electroluminescence device, according to the present invention. As shown in FIG. 4, the multilayer electroluminescence device of the present invention has a substrate 11 on which a lower electrode 12, a first insulation layer 13, a multiply luminescent layer 14, a second insulation layer 15 and an upper insulation layer 16 are in sequence deposited with the lower and the upper electrodes 12, 15 formed with their respective predetermined patterns.

Figure 5:
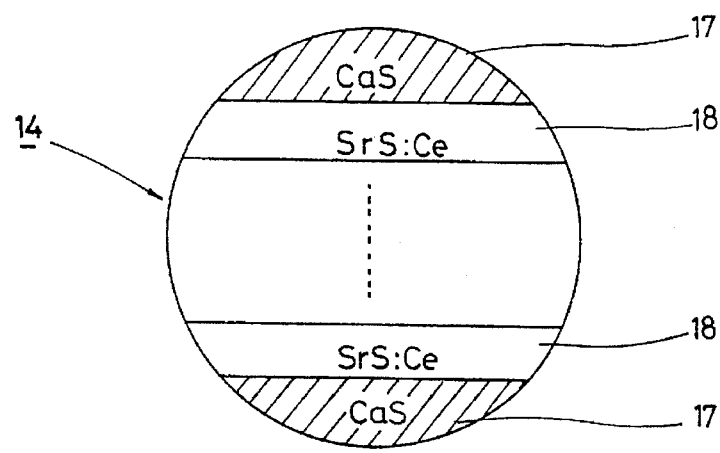
FIG. 5 is a schematic, fragmentary enlarged cross sectional view of the multiply luminescent layer of FIG. 4.

Referring now to FIG. 5, there is in detail shown the multiply luminescent layer 14. As shown in this drawing, the multiply luminescent layer 14 is of similar structure to that of the multiply luminescent layer 4 shown in FIG. 2, except that a CaS ply 17 is substituted for the ZnS ply 7.

Accordingly, the uppermost ply and the lowest ply of the multiply luminescent layer 14 both are made of CaS and come into contact with the first insulation layer 13 and the second insulation layer 15, respectively.

With regard to function of the multiply luminescent layer 14, the outmost upper and lower plies 17 of CaS serve as buffer layers which not only prevent chemical reaction of the first and second insulation layers 13, 15 with the SrS ply 18 doped with cesium, a fluorescent ply but also improve crystallinity of the CaS ply 18. On the other hand, the intermediate plies of CaS 17 in the multiply luminescence layer 14 play a role of acceleration layers in which excited electrons are accelerated. Function of the intermediate plies of SrS 18 is to emit light attributed to the accelerated electrons.

Figure 6:
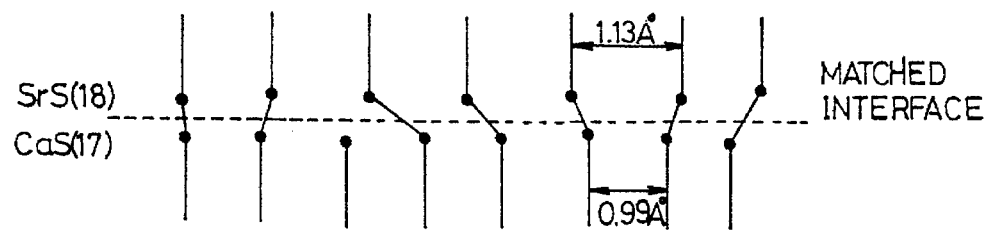
FIG. 6 shows a matched interface between a CaS ply and a SrS ply in the multiply luminescent layer of FIG. 1 according to the present invention.

A method for the fabrication of multilayer electroluminescence device according to the present invention will be now described in conjunction with the FIGS. 4 through 6.

First, on a substrate 11, for example, a glass substrate, there is deposited with an ITO layer which is then subjected to photolithography, to form a transparent lower electrode 12 of ITO having a predetermined pattern.

Subsequently, a first insulation layer 13 is deposited on the substrate 11 provided with the lower electrode 12.

Thereafter, using an electron beam evaporation or sputtering process, a CaS ply 17 is deposited in a thickness of approximately 500 to approximately 1,000 Angstrom at a temperature of approximately 500° to approximately 800° C. on the first insulation layer 13, followed by deposition of a SrS ply 18 doped with cesium in a thickness of approximately 1,500 to approximately 2,000 Angstrom at 500° C. on the CaS ply 17. The dope of cesium is to emit a light of blue color. Until the a multiply luminescent layer 14 of 5 to 9 stories are formed, other CaS plies 17 and other SrS plies 18 are alternatively laminated in the just mentioned manner. As previously described, the multiply luminescent layer 14 has an outmost upper ply and an outmost lower ply which both are formed of CaS.

In the present invention, it is preferred that the thickness of such multiply luminescent layer 14 is on the order of approximately 6,000 Angstrom when the number of the total stories of the CaS ply 17 and the SrS ply 18 is 5. On the other hand, the multiply luminescent layer 14 is preferably approximately 1.1 μm thick when it consists of 5 stories of the CaS ply 17 and 4 stories of the SrS ply 18.

Figure 2:
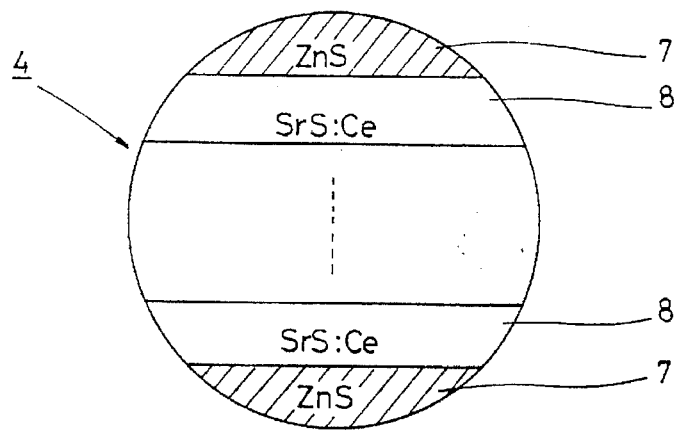
FIG. 2 is a schematic, fragmentary enlarged cross sectional view of the multiply luminescent layer of FIG. 1.
Figure 3:
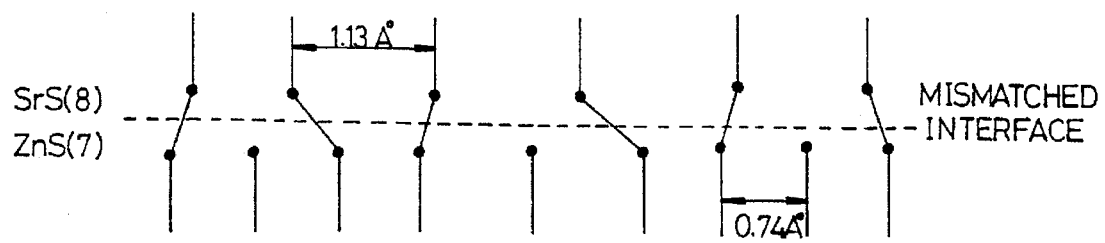
FIG. 3 shows a dismatched interface between a ZnS ply and a SrS ply in the conventional multiply luminescent layer of FIG. 1.

Finally, a second insulation layer 15 is deposited on the luminescent multilayer 14, followed by formation of an upper electrode 16 on the second insulation layer 15, in the same manner as that described for the conventional luminescence device of FIG. 2.

As mentioned above, the difference of lattice constant between the SrS ply and the ZnS ply in the conventional multiply luminescent layer reaches 35%. To the contrary, since CaS, employed in the present invention as substituent for conventional ZnS, has an ionic radius of approximately 0.99 Angstrom, the difference of lattice constant between the SrS ply and the CaS ply comes to amount to only 12% which is considerably less than the maximum allowable difference of the lattice constant required to obtain a matched interface, 16%. Therefore, lamination of the two plies making a small difference in lattice constant, the SrS ply 18 and the CaS ply 17, leads to a matched interface therebetween, as shown in FIG. 6.

In the multilayer etectroluminescence device fabricated by the method according to the present invention, application of an alternating current voltage of about 150 V to both the upper and lower electrodes makes the electrons present in interface states between the insulation layers and the luminescent layer be accelerated. As these accelerated electrons travel, they impact upon cesium, the dopant of the SrS ply 18, emitting light. For this luminescent mechanism, the outermost electrons of the cesium are excited to the conduction band by absorbing energy upon impact and then falls into a valence band. In the meanwhile, a light corresponding to the same energy as difference between the conduction band and the valence band is emitted from the multiply luminescent layer 14.

To increase the quantity of the light, it is required that cesium atoms be uniformly distributed in the interior of the SrS plies 18. In addition, not only must a number of electrons move upon application of voltage, but the electrons are demanded to rapidly move with large energy. Thence, it is preferred that the electrons are accelerated in the CaS plies 17 in which cesium atoms are absent, rather than in the SrS plies 18 in which they come into frequent collision with cesium atoms, the dopants thereof.

As previously mentioned, the CaS plies 17 are deposited at 500° C. which is the same with or almost similar to temperature at which the SrS plies 18 are deposited in accordance with the present invention. Therefore, the crystallinity of the CaS plies 17 can be generously improved and a matched interface is possible to provide for the interface between the CaS ply 17 and the SrS ply 18, according to the method of the present invention.

Meanwhile, the better is the crystallinity of the acceleration ply, the faster the electrons are accelerated. The CaS ply 17 of the present invention can serve as an excellent acceleration layer by virtue of not only its superior crystallinity but also its matched interface through which electrons move into the interior of the SrS ply 17 without reduction their moving velocity.

As described hereinbefore, CaS and SrS, constituents of the luminescent layer of the present invention, are deposited at the same or almost similar temperature, so that the thermal stress between the CaS ply and the SrS ply is remarkably relieved relative to between the conventional ZnS ply and SrS ply. In addition, since a virtually matched interface between the SrS ply and the CaS ply can be accomplished by virtue of small difference of lattice constant therebetween, another stress of the luminescent layer, largely caused by mismatched interfaces between two kinds of constituent plies in the conventional luminescent layer, is possible to reduce.

Consequently, the method according to the present invention can prevent a peeling phenomenon of the luminescence layer, bringing about an effect that more stable multilayer electroluminescence devices are fabricated.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A method for fabricating an electroluminescence device, comprising the steps of:
   (a) forming a lower electrode with a first pattern on a substrate:
   (b) forming a first insulation layer on the lower electrode atop the substrate;
   (c) forming a first ply;
   (d) forming a second ply which is different from the first ply;
   (e) alternating steps (c) and (d) at substantially the same temperature to form a multi-layered luminescent layer on the first insulation layer;
   (f) forming a second insulation film on the multi-layered luminescent layer; and
   (g) forming an upper electrode with a second pattern on the second insulation layer, wherein an outmost lower ply and an outmost upper ply are made of CaS and are in contact with said first insulation layer and said second insulation layer, respectively.

2. The method of claim 1, wherein said first and second plies consist of CaS and SrS plies, respectively.

3. The method of claim 1, wherein said multi-layered luminescent layer is deposited at temperatures ranging from approximately 500° to approximately 800° C.

4. A device made from the method of claim 1.

* * * * *